July 29, 1969  J. GVOZDJAK  3,458,686
ELECTRIC HEATING OVEN WITH HEAT CIRCULATION MEANS
Filed April 13, 1967  2 Sheets-Sheet 1

INVENTOR.
JOHN GVOZDJAK
BY
David M. Schiller
ATTORNEY

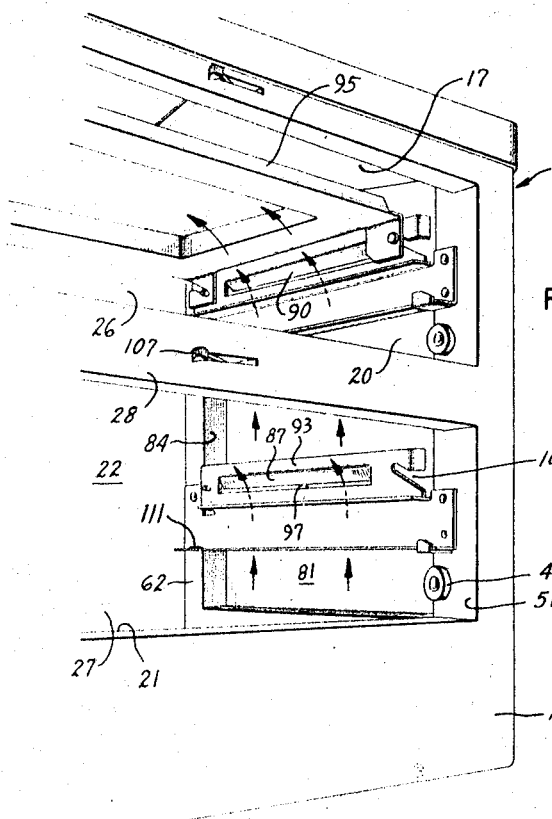
FIG. 4
FIG. 5
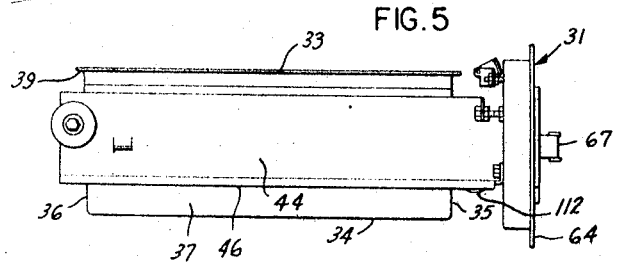
FIG. 6
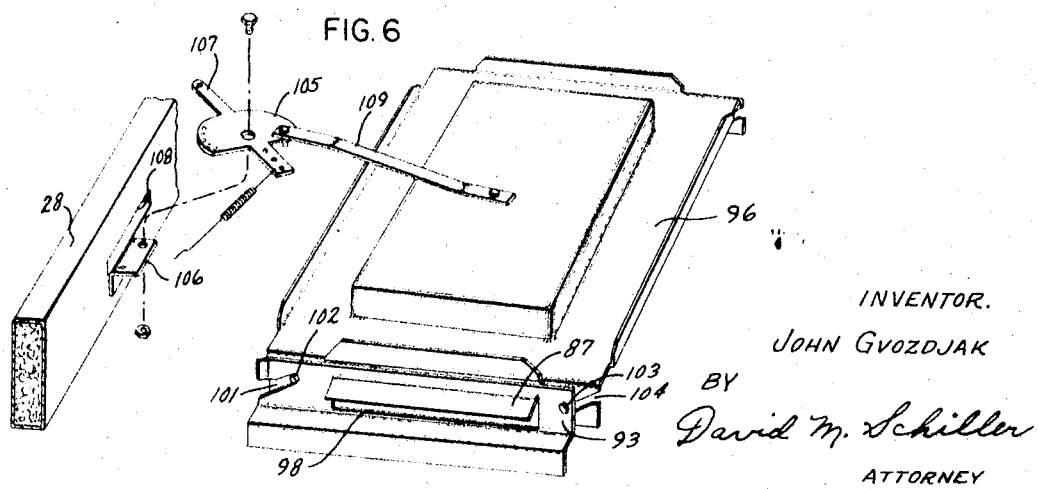
INVENTOR.
JOHN GVOZDJAK
BY
David M. Schiller
ATTORNEY United States Patent Office 3,458,686
Patented July 29, 1969

3,458,686
ELECTRIC HEATING OVEN WITH HEAT
CIRCULATION MEANS
John Gvozdjak, Lansing, Ill., assignor to General Electric
Company, a corporation of New York
Filed Apr. 13, 1967, Ser. No. 630,716
Int. Cl. A21b 1/26, 1/50; F27d 3/00
U.S. Cl. 219—400                                18 Claims

ABSTRACT OF THE DISCLOSURE

A food heating device includes a plurality of louvers for diverting portions of rising heated air from vertical side channels into the device chamber in a manner to reduce the normally existing temperature differential between a pair of vertically spaced food containers in the chamber. Two louvers are vertically spaced within each channel to divert portions of heated air from the channels into the chamber at areas adjacent the tops of the food containers.

---

Food heating devices such as hot food servers conventionally include a chamber in which are mounted two or more vertically spaced food containers heated by circulating air heated by suitable heating means adjacent the bottom of the chamber. In prior designs of this general nature the upper food container and its contents are normally heated to a temperature considerably greater than the temperature to which the lower container and its contents are heated. This resulting temperature differential is very undesirable in many applications inasmuch as any preselected heat and time setting of the device will result in one of the container and its contents being either overheated or underheated. The present invention overcomes this disadvantage and others of prior art food heating devices.

Accordingly, it is a primary object of the invention to provide a novel and improved food heating device wherein a plurality of vertically spaced food containers and their contents are consistently and efficiently heated to substantially the same temperature.

It is another object of the invention to provide a hot food server including a plurality of vertically spaced food containers with novel and improved means of inexpensive design for consistently and efficiently maintaining the containers and their contents at substantially the same temperature.

In carrying out the invention in one preferred form thereof, a hot food server is provided including a housing defining a chamber in which are mounted a pair of vertically spaced food containers also spaced from the housing walls. Heating means are located within the chamber adjacent its bottom to heat air therein, and a pair of channels extend vertically along opposite sides of the containers for conducting heated air from the bottom of the chamber to upper areas thereof. With such an arrangement the food containers are normally heated by heated air circulating within the chamber such that the upper container and its contents are heated to a temperature considerably greater than the temperature to which the lower container and its contents are heated. Means are positioned in the channels to divert portions of rising heated air from the channels into the chamber to reduce the differential in temperatures to which the containers are normally heated.

Other objects and advantages of the invention will become apparent from the following description taken in conjunction with the accompanying drawings, in which.

Figure 1:
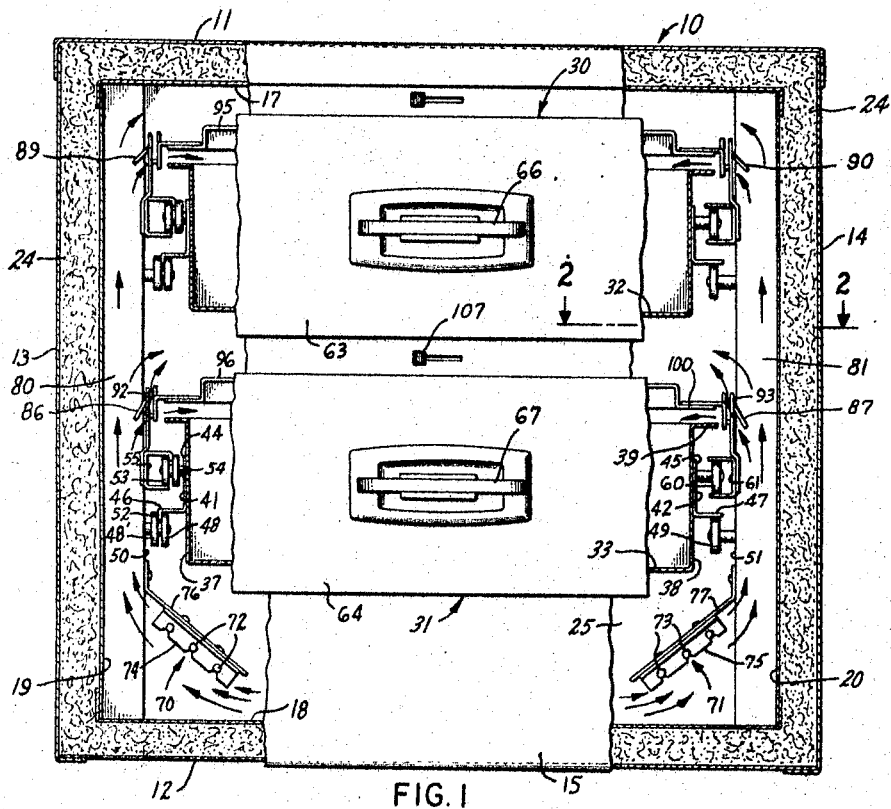
FIGURE 1 is a view in front elevation with parts broken away of a food heating device constructed according to the invention.
Figure 2:
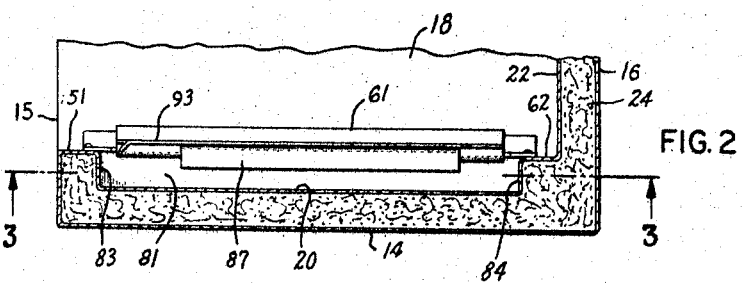
FIGURE 2 is a view in section taken along the line 2—2 of FIGURE 1.

FGIURE 3 is a view in section taken along the line 3—3 of FIGURE 2;

FIGURE 4 is a fragmentary view in perspective of the device of FIGURE 1 with the food containers removed showing the interior of the housing at the right hand side thereof;

FIGURE 5 is a view in side elevation of a drawer assembly including a food container employed in the device of FIGURE 1; and FIGURE 6 is a view in perspective showing a cover for one of the food containers and the actuating mechanism for raising and lowering the cover.

Referring now to the drawing there is illustrated in FIGURE 1 a food heating device constructed in accord with the invention. While the invention is applicable to a wide variety of food heating devices, it will be described in connection with a hot food server which is designed to maintain in a heated condition precooked food items of various types. The hot food server is shown in FIGURE 1 as comprising a housing represented generally by the numeral 10 and including outer top and bottom walls 11 and 12, outer side walls 13 and 14, and outer front and rear walls 15 and 16. Spaced inwardly of the outer walls are inner top and bottom walls 17 and 18, inner side walls 19 and 20, and inner front and rear walls 21 and 22. The inner and outer walls may be formed of any suitable material such as sheet steel in the form of plates having overlapping ends secured together in any suitable manner. The space between the inner and outer walls is preferably filled with a suitable thermal insulating material 24. The inner walls of the housing define a chamber 25 which opens at the front of the housing through a pair of openings 26 and 27 spaced vertically by a horizontal partition 28.

In order to provide removable receptacles for food to be heated, a pair of drawer assemblies 30 and 31 include respectively open top pans or containers 32 and 33 and are mounted within the chamber 25 in vertically spaced relation for insertion and withdrawal relative to the chamber through the front openings 26 and 27. The drawer assemblies are identical in construction and for this reason details of the drawer assembly 31 only will be described. Referring to FIGURES 1 and 5 the container 33 of the assembly 31 is of generally rectangular configuration including a flat bottom wall 34, a front wall 35, a rear wall, 36, and spaced side walls 37 and 38 with a flange 39 surrounding the open top of the container. The containers 32 and 33 when mounted within the chamber are spaced from all the inner walls of the housing.

In order to mount the assemblies 30 and 31 for insertion and withdrawal relative to the chamber 25, a plurality of cooperating rail and roller structures are carried by the assemblies 30 and 31 and the housing. Inasmuch as the mounting means for each drawer assembly is identical, only the mounting means for the drawer assembly 31 will be described in detail. In the specific embodiment illustrated in FIGURE 1 the mounting means comprises a pair of elongated L-shaped brackets 41 and 42 including respectively sections 44 and 45 attached to the side walls 37 and 38 of container 33 and laterally extending rail sections 46 and 47 engaging at their undersurfaces rollers 48 and 49 mounted by the housing adjacent its front by inwardly disposed portions 50 and 51 of the inner side walls 19 and 20 respectively. For alignment purposes the rail section 46 of the bracket 41 includes a downwardly extending terminal flange 52 which projects into the space between the roller 48 and another roller 48' axially spaced from the roller 48. The brackets 41 and 42 have length dimensions extending perpendicular to the paper in FIGURE 1 which are greater than the corresponding length dimensions of the container 33 and the sections 44 and 45 mount respectively at their rear ends rollers which cooperate with rails carried by the housing. Specifically, as shown in FIGURES 1 and 5 the section 44 of the bracket 41 supports a pair of axially spaced rollers 53 and 54 cooperating with an elongated channel shaped rail 55 attached at its ends to the front wall portion 50 and to a rear wall portion (not shown). The roller 53 engages the inner confronting surfaces of the flanges of the rail 55 and for alignment purposes, the upper flange of the rail 55 has a terminal projection which extends into the space between the rollers 53 and 54. At the opposite side of the container 33 the section 45 of the bracket 42 supports at its rear a roller 60 within an elongated channel shaped rail 61 secured at its ends to the wall portion 51 and to a rear wall portion 62 as shown in FIGURE 4. The mounting means for the container 32 is identical in all respects to the mounting means described for the container 33.

In order to facilitate insertion and withdrawal of the containers relative to the chamber 25 and to close the openings 26 and 27 when the containers are within the chamber, the drawer assemblies 30 and 31 include as shown in FIGURES 1 and 5 handled doors 63 and 64 attached in any suitable manner to forwardly extending portions of the side brackets on the containers 32 and 33 in spaced relation with the front walls of the containers. The doors 63 and 64 are of rectangular configuration conforming to that of the openings 26 and 27 but the areas of the doors are greater than the areas of the respective openings so that when the drawer assemblies are fully inserted within the chamber 25, inner surfaces of the doors abut sections of the outer wall 15 surrounding the openings 26 and 27. Secured in any suitable manner to front surfaces of the doors are handles 66 and 67 to be grasped by an operator to facilitate movement of the drawer assemblies relative to the housing.

In order to heat air within the chamber 25, a pair of heating assemblies 70 and 71 are located adjacent the bottom of the chamber at opposite sides thereof. In the embodiment illustrated in FIGURE 1 the heating assemblies comprise respectively electric heating elements 72 and 73 mounted to extend longitudinally between the front and rear areas of the housing. The heating elements 72 and 73 are staked to members 74 and 75 which in turn are supported by brackets 76 and 77 secured at their ends to the same wall portions to which the rails 55 and 61 are secured.

In accord with one aspect of the present invention the heating assemblies 70 and 71 are arranged as baffle structures to direct heated air beneath the heating assemblies outwardly and upwardly adjacent the sides of the chamber 25. To this end the heating assemblies are mounted to extend downwardly and inwardly from their mounted ends in spaced relation with the bottom wall 18 and the inner side walls 19 and 20. The direction of flow of air within the chamber is generally shown by the arrows in FIGURE 1 with the air as it is heated at the bottom of the chamber flowing outwardly and upwardly along the sides of the containers and therebetween. As heat is given off, the air flows downwardly in the spaces between the inner front and rear walls of the housing and the front and rear walls of the containers to the bottom of the chamber where it is again heated.

In order to conduct heated air upwardly from the bottom of the chamber to upper areas thereof, a pair of channels 80 and 81 extend vertically along opposite sides of the containers 32 and 33 adjacent the inner side walls 19 and 20. The channels are identical in configuration and as best shown in FIGURES 2 and 4, the channel 81 is defined by the inner side wall 20 and spaced wall portions 83 and 84 which as viewed in FIGURE 2 extend perpendicular to the wall 20 at its ends. The channels extend the full height of the chamber 25 and have dimensions extending front-to-rear of the housing which are only slightly less than the front-to-rear dimension of the chamber. The heating assemblies 70 and 71, the lower rails 55 and 61, and the corresponding upper rails are mounted to bridge their associated channels 80 and 81 which are thereby partially closed along their vertical extent. As shown in FIGURE 1, the heating assemblies 70 and 71 are arranged to direct heated air from the bottom of the chamber into lower areas of the channels 80 and 81 which then conduct the heated air upwardly resulting in circulation of air through the chamber. It has been observed, however, that although air circulates through the chamber, the containers 32 and 33 and their contents are heated to different temperatures with the upper container 32 being heated to a temperature considerably greater than the temperature to which the lower container 33 is heated. In many applications such temperature differential is undesirable inasmuch as for a given heat and time setting of the food server one of the containers and its contents will either be overheated or underheated. This undesirable temperature differential is believed to be caused by stratification of air within the chamber.

In accord with the invention means are positioned in one or both of the channels 80 and 81 to divert a portion of the rising heated air from the channel into the chamber to reduce the differential in temperature to which the containers are normally heated. Such means according to the invention includes a louver extending into one or both of the channels and while the provision of a single louver within one of the channels 80 and 81 operates to reduce the undesirable temperature differential to some extent, further improvement is realized by the provision of two louvers 86 and 87 extending respectively into the channels 80 and 81 adjacent the open top of the lower container 33. The temperature differential is still further reduced in accord with the invention by the provision of two additional louvers 89 and 90 extending into the channels 80 and 81 respectively adjacent the open top of the upper container 32. Excellent results have been realized by forming the louvers 89 and 90 to extend into the associated channels at angles relative to the vertical which are greater than the corresponding angles of the louvers 86 and 87. In the preferred embodiment illustrated the angles of the upper louvers 89 and 90 are of the order of 45° while the angles of the lower louvers 86 and 87 are approximately 30°. With such arrangement, it has been observed that the temperature differential is practically eliminated. Apart from their different angular extensions, the upper and lower pairs of louvers are identical and therefore details of their mounting and configuration will be described in connection with the lower louvers 86 and 87.

Any suitable means may be utilized to mount the louvers to extend into their associated channels. In the embodiment of the invention illustrated the louvers 86 and 87 are mounted by guide plates 92 and 93 which are conveniently secured to the rails 55 and 61 for positioning above the rails. Similar upper guide plates mount the louvers 89 and 90 and the upper and lower guide plates respectively support and guide a pair of moveable covers 95 and 96 for movement between lower and upper positions relative to the containers 32 and 33 to respectively close and expose the open tops of the associated containers. The louvers are conveniently formed integrally with their associated guide plates and preferably comprise struck out portions thereof. As best shown in FIGURE 4 the guide plate 93 includes an opening 97 beneath the louver 87 formed by striking out the louver 87 and as viewed in FIGURE 1 the opening 97 is laterally displaced from the passage formed between the flange 39 of the container 33 and the flange 100 of the cover 96 when the cover is in its upper position. Thus, with the described arrangement the louvers 86 and 87 divert portions of the rising heated air from the channels 80 and 81 toward the container 33 to not only increase the temperature of the container 33 and its contents, but also to reduce the amount of heated air rising toward the container 32. When the cover 96 is in its upper position, the louvers 86 and 87 divert heated air into the container 33 to assure crispness of the food item when such is desired and a portion of the diverted air is directed between the cover 96 and the bottom wall of the container 32 as well as along the sides of the container 32. When the cover 96 is lowered, substantially all the diverted air is directed between the cover 96 and the bottom wall of the container 32 and along the sides of the container 32. The upper louvers 89 and 90 perform similar air diverting and restricting functions.

When the covers are moved to their upper positions as shown in FIGURE 1, they assume so-called CRISP positions wherein heated air is admitted to the associated containers to evaporate moisture from the food items therein. When the covers are moved to their lower positions wherein they cover the containers, they assume so-called MOIST positions wherein heated air cannot enter the containers thus resulting in retention of moisture by the food items. Since the means employed to mount and guide the covers for movement are identical, only the mounting and guiding means for the cover 96 will be described.

Figure 3:
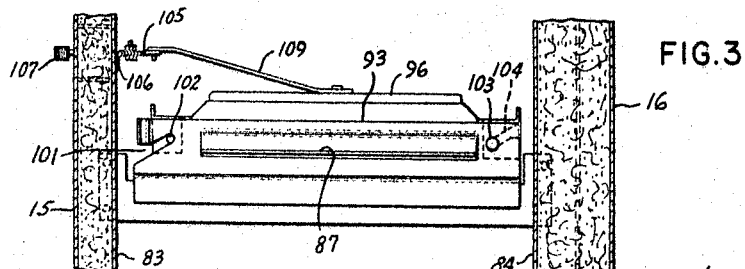

In order to mount and guide the cover 96 for movement between its upper and lower positions, each of the guide plates 92 and 93 includes a pin and an inclined slot cooperating respectively with an inclined slot and a pin on the cover. As best shown in FIGURES 3 and 6 the guide plate 93 includes at its front an inclined slot 101 and at its rear a pin 103 cooperating respectively with a pin 102 and an inclined slot 104 on a depending flange of the cover. Identical pin and slot constructions are employed in connection with the cover 95 and the upper guide plates. In order to effect movement of the cover 96 there is provided an actuator 105 shown in FIGURE 6 as mounted for rotary movement on a ledge 106 secured to the inner surface of the partition 28. The actuator 105 has an actuating stem 107 projecting forwardly through a slot 108 outside of the device for actuation by an operator. A link 109 has one end fastened to the top of the cover and its other end pivotally attached to the actuator 105. An identical actuating mechanism is provided for the cover 95 associated with the container 32.

In order to permit an initial lowering movement of the containers 32 and 33 during their withdrawal toward the front of the housing from their inserted positions, the lower flanges of the rails on the housing have raised portions adjacent their rear ends and the undersides of the rail sections of the brackets on the containers have depending portions adjacent their front ends which cooperate respectively with the rollers on the containers and on the housing. With this arrangement when the drawer assemblies are inserted into the chamber, they will be elevated somewhat at the end of their insertion movement so that when the drawer assemblies are subsequently withdrawn with the associated covers in their lower positions, the withdrawal movement of the drawer assemblies will be initially accompanied with a downward movement thereof which minimizes scraping of the flanges of the containers along the flanges of the covers during the withdrawal movement. In FIGURE 4 a raised portion 111 is shown at the rear of the rail 61 on its lower flange and in FIGURE 5 a depending portion 112 is shown at the front end of the rail section 46 of the bracket 41 on the container 33.

By means of the invention the normal existing temperature differential between the containers and their contents is materially reduced, practically to the vanishing point. The louvers 86 and 87 associated with the lower container 33 are effective to divert portions of the rising heated air from the channels 80 and 81 into the container when its cover is raised and against the side of the container when its cover is lowered. In addition, the louvers 86 and 87 serve to reduce the amount of heated air flowing upwardly toward the container 32. The louvers 89 and 90 associated with the container 32 divert portions of the remaining heated air against the container 32 similar to the action of the lower louvers. The upper louvers also serve to further reduce the amount of the remaining heated air flowing to the top of the chamber. The louvers are very effective in minimizing stratification of air within the chamber and in substantially eliminating the normally existing temperature differential between the containers.

Although the invention has been described with reference to certain specific embodiments thereof, numerous modifications are possible and it is desired to cover all modifications falling within the spirit and scope of the invention.

What I claim and desire to secure by Letters Patent of the United States is:

1. A food heating device comprising in combination:
   a housing having walls defining a thermally insulated chamber opening at the front,
   a pair of open top containers mounted within said chamber for receiving food to be heated,
   means mounting said containers in vertically spaced relation and spaced from said housing walls for insertion and withdrawal relative to said chamber through said front opening,
   a separate cover for each container,
   means mounting each of said covers for movement relative to its associated container between a lower position wherein the cover closes the open top of its associated container and an upper position wherein the cover exposes the open top to permit heated air to enter the associated container,
   means actuatable to effect independent movement of said covers between their lower and upper positions,
   electric heating means adjacent the bottom of said chamber for heating air in said chamber,
   a pair of spaced channels extending vertically along opposite sides of said containers for conducting heated air from the bottom of said chamber to upper areas of said chamber,
   said containers being heated by heated air circulating within said chamber such that normally the upper one of said containers is heated to a temperature greater than the temperature to which the lower container is heated, and
   means positioned in said channels to divert portions of rising heated air from said channels into said chamber to reduce the differential in temperatures to which the containers are normally heated.

2. A device as defined in claim 1 wherein said last-named means comprises a pair of horizontally spaced louvers each positioned adjacent the top of said lower container to extend downwardly and outwardly into a separate channel to divert a portion of heated air from its associated channel into said lower container when the associated cover is in said upper position.

3. A device as defined in claim 1 wherein said last-named means comprises upper and lower vertically spaced pairs of louvers, the louvers of each pair being horizontally spaced and positioned adjacent the top of their associated container to extend downwardly and outwardly into a separate channel to divert portions of heated air from said channels into the associated containers when said covers are in their upper positions.

4. A device as defined in claim 3 wherein the upper and lower louvers extend from the vertical at angles of the order of 45° and 30° respectively.

5. A device as defined in claim 1 wherein said means mounting said covers comprises a pair of guide plates fixedly mounted adjacent opposite sides of each cover, and cooperating pins and slots on said guide plates and covers,
   said last-named means comprising a louver struck out from each guide plate to extend into the adjacent channel and to define an opening in the guide plate through which heated air is diverted from the associated channel by said louver.

6. A device as defined in claim 5 wherein the louvers struck out from the upper guide plates extend from the vertical at acute angles greater than the corresponding angles of the louvers struck out from the lower guide plates.

7. A device as defined in claim 1 wherein said means mounting said containers comprises a separate pair of rails fixedly mounted to bridge said channels adjacent opposite sides of each container, and a separate pair of rollers mounted on opposite sides of each container cooperating with said rails, said means mounting said covers comprising a separate guide plate carried by each rail, and cooperating pins and slots on said guide plates and covers, said last-named means comprising a louver struck out from each guide plate to extend into the adjacent channel to define an opening in the guide plate through which heated air is diverted from the associated channel by said louver.

8. A device as defined in claim 1 wherein said heating means comprises a pair of electric heating element assemblies arranged as baffle structures mounted adjacent the bottoms of said channels to extend downwardly and outwardly away from said channels to direct heated air beneath said assemblies into said channels.

9. A device as defined in claim 1 wherein said heating means comprises a pair of electric heating element assemblies arranged as baffle structures mounted adjacent the bottoms of said channels to extend downwardly and outwardly away from said channels to direct heated air beneath said assemblies into said channels, said last-named means comprising upper and lower vertically spaced pairs of louvers, the louvers of each pair being horizontally spaced and positioned adjacent the top of their associated container to extend downwardly and outwardly into a separate channel to divert portions of heated air from said channels into the associated containers when said covers are in their upper positions.

10. A device as defined in claim 1 wherein said heating means comprises a pair of electric heating element assemblies arranged as baffle structures mounted adjacent the bottoms of said channels to extend downwardly and outwardly away from said channels to direct heated air beneath said assemblies into said channels, said means mounting said covers comprising a pair of guide plates fixedly mounted adjacent opposite sides of each cover, and cooperating pins and slots on said guide plates and covers, said last-named means comprising a louver struck out from each guide plate to extend into the adjacent channel and to define an opening in the guide plate through which heated air is diverted from the associated channel by said louver.

11. A device as defined in claim 10 wherein the louvers struck out from the upper guide plates extend from the vertical at acute angles greater than the corresponding angles of the louvers struck out from the lower guide plates.

12. A food heating device comprising in combination:
a housing having top and bottom walls, front and rear walls, and sidewalls defining a thermally insulated chamber opening at the front,
a pair of containers mounted within said chamber for receiving food to be heated,
means mounting said containers in vertically spaced relation and spaced from said housing walls for insertion and withdrawal relative to said chamber through said front opening,
electric heating means in said chamber adjacent said bottom wall for heating air in said chamber,
a pair of spaced channels extending vertically along opposite sides of said containers for conducting heated air from the bottom of said chamber to upper areas of said chamber,
said containers being heated by heated air circulating within said chamber such that normally the upper one of said containers is heated to a temperature greater than the temperature to which the lower container is heated,
plate means mounted at opposite sides of said containers adjacent said channels, and
upper and lower pairs of louvers struck out from said plate means to define openings in said plate means, the louvers of each pair being positioned at opposite sides of said containers, said louvers extending downwardly and outwardly from said plate means toward said sidewalls into said channels to divert portions of heated air from said channels through the associated openings toward said containers.

13. A device as defined in claim 12 wherein the upper louvers extend from the vertical at acute angles greater than the corresponding angles of the lower louvers.

14. A device as defined in claim 13 wherein said angles of said upper and lower louvers are of the order of 45° and 30° respectively.

15. A device as defined in claim 12 wherein said heating means comprises electric heating elements arranged as a baffle structure mounted adjacent the bottoms of said channels to extend downwardly and outwardly away from the channels to direct heated air beneath the heating means into the channels.

16. A device as defined in claim 15 wherein the upper louvers extend from the vertical at acute angles greater than the corresponding angles of the lower louvers.

17. A device as defined in claim 12 wherein said means mounting said containers comprises a separate pair of rails fixedly mounted to bridge said channels adjacent opposite sides of each container, and a separate pair of rollers mounted on opposite sides of each container cooperating with said rails.

18. A device as defined in claim 17 wherein said plate means are carried by said rails.

References Cited

UNITED STATES PATENTS

| 975,107 | 11/1910 | Ayer et al. | 219—400 |
|---------|---------|-------------|---------|
| 1,001,637 | 8/1911 | Gray | 219—400 |
| 2,919,339 | 12/1959 | Hilliker | 219—400 |
| 2,926,655 | 3/1960 | Martin | 126—21 |
| 3,261,650 | 7/1966 | Stromgvist | 312—236 |

FOREIGN PATENTS

| 331,593 | 7/1930 | Great Britain. |

VOLODYMYR L. MAYEWSKY, Primary Examiner

U.S. Cl. X.R.

99—447; 126—21; 219—375; 312—236